(12) United States Patent
Kellam et al.

(10) Patent No.: US 12,292,601 B2
(45) Date of Patent: May 6, 2025

(54) BUS DISTRIBUTION USING MULTIWAVELENGTH MULTIPLEXING

(71) Applicant: Rambus Inc., San Jose, CA (US)

(72) Inventors: Mark D. Kellam, Siler City, NC (US); Dongyun Lee, Sunnyvale, CA (US); Thomas Vogelsang, Mountain View, CA (US); Steven C. Woo, Saratoga, CA (US)

(73) Assignee: Rambus inc., San Jose, CA (US)

( * ) Notice: Subject to any disclaimer, the term of this patent is extended or adjusted under 35 U.S.C. 154(b) by 400 days.

(21) Appl. No.: 17/963,065

(22) Filed: Oct. 10, 2022

(65) Prior Publication Data
US 2023/0125262 A1    Apr. 27, 2023

Related U.S. Application Data

(60) Provisional application No. 63/271,835, filed on Oct. 26, 2021.

(51) Int. Cl.
| G02B 6/293 | (2006.01) |
| G02B 6/12  | (2006.01) |
| H04B 10/50 | (2013.01) |

(52) U.S. Cl.
CPC ....... *G02B 6/2938* (2013.01); *G02B 6/12007* (2013.01); *H04B 10/506* (2013.01)

(58) Field of Classification Search
CPC .......... G02B 6/2938; G02B 6/12007; H04B 10/506; H04J 14/028
See application file for complete search history.

(56) References Cited

U.S. PATENT DOCUMENTS

| 5,608,826 A  | 3/1997  | Boord et al. |
| 6,904,239 B2 | 6/2005  | Chow et al.  |
| 7,106,611 B2 | 9/2006  | Lee et al.   |
| 7,123,793 B2 | 10/2006 | Ridgway      |
| 7,254,331 B2 | 8/2007  | Murphy       |

(Continued)

OTHER PUBLICATIONS

Beamer, Scott et al., "Re-Architecting DRAM Memory Systems With Monolithically Integrated Silicon Photonics", ISCA '10, Jun. 19-23, 2010, Saint-Malo, France, 2010 ACM 978-1-4503-0053-Jul. 10, 2006. 12 pages.

(Continued)

*Primary Examiner* — John Bedtelyon
(74) *Attorney, Agent, or Firm* — The Neudeck Law Firm, LLC

(57) ABSTRACT

Command/address and timing information is distributed to buffer integrated circuits on a module using multiple wavelengths of light modulated with the same information. Each individual wavelength of modulated light carrying command/address information is received by a corresponding single buffer device that deserializes the command/address information and communicates it electrically to memory devices(s). Likewise, each individual wavelength of modulated light carrying timing/synchronization/clock information is received by a corresponding single buffer device and used to synchronize accesses to the memory device(s). Thus, multiple buffer integrated circuits on a module each receive information from the CPU using different wavelengths of light transmitted on the same waveguide.

20 Claims, 14 Drawing Sheets

(56) References Cited

U.S. PATENT DOCUMENTS 7,489,875 B2 2/2009 Murphy
2023/0008889 A1* 1/2023 Vogelsang .......... G11C 11/4063

OTHER PUBLICATIONS

Vantrease, Dana et. al., "Corona: System Implication of Emerging Nanophotonic Technology", ACM SIGARCH Computer Architecture News, vol. 36, No. 3. https://doi.org/10-1145-1394608.1382135, Jun. 2008, 12 pages.

* cited by examiner

RECEIVE, FROM A HOST SYSTEM AND VIA AN OPTICAL INTERFACE OF A MODULE, A FIRST LIGHT WAVE CARRIER CARRYING COMMAND/ADDRESS (CA) INFORMATION AND A SECOND LIGHT WAVE CARRIER CARRYING SYNCHRONIZATION INFORMATION, THE FIRST AND SECOND LIGHT WAVE CARRIERS HAVING DIFFERENT WAVELENGTHS
702

COUPLE THE FIRST AND SECOND LIGHT WAVE CARRIERS INTO A POLYMER WAVEGUIDE DISPOSED ON THE MODULE
704

COUPLE THE FIRST AND SECOND LIGHT WAVE CARRIERS FROM THE POLYMER WAVEGUIDE INTO A FIRST SILICON WAVEGUIDE DISPOSED ON A FIRST INTEGRATED CIRCUIT
706

COUPLE THE FIRST LIGHT WAVE CARRIER TO A FIRST LIGHT SENSING DEVICE DISPOSED ON THE FIRST INTEGRATED CIRCUIT TO RECEIVE THE CA INFORMATION FROM THE FIRST LIGHT WAVE CARRIER
708

COUPLE THE SECOND LIGHT WAVE CARRIER TO A SECOND LIGHT SENSING DEVICE DISPOSED ON THE FIRST INTEGRATED CIRCUIT TO RECEIVE THE SYNCHRONIZATION INFORMATION FROM THE SECOND LIGHT WAVE CARRIER
710

*FIG. 7*

```
┌─────────────────────────────────────────────────────────────┐
│  RECEIVE, FROM A HOST SYSTEM AND VIA AN OPTICAL INTERFACE   │
│  OF A MODULE, A FIRST LIGHT WAVE CARRIER CARRYING           │
│  COMMAND/ADDRESS (CA) INFORMATION AND A SECOND LIGHT WAVE   │
│            CARRIER CARRYING TIMING INFORMATION              │
│                             802                             │
└─────────────────────────────────────────────────────────────┘
                              │
                              ▼
┌─────────────────────────────────────────────────────────────┐
│  RECEIVE, FROM A HOST SYSTEM AND VIA THE OPTICAL INTERFACE  │
│  OF THE MODULE, A THIRD LIGHT WAVE CARRIER CARRYING THE CA  │
│   INFORMATION AND A FOURTH LIGHT WAVE CARRIER CARRYING THE  │
│   TIMING INFORMATION, THE FIRST, SECOND, THIRD, AND FOURTH  │
│     LIGHT WAVE CARRIERS EACH HAVING DIFFERENT WAVELENGTHS   │
│                             804                             │
└─────────────────────────────────────────────────────────────┘
                              │
                              ▼
┌─────────────────────────────────────────────────────────────┐
│   COUPLE THE FIRST, SECOND, THIRD, AND FOURTH LIGHT WAVE    │
│  CARRIERS INTO A POLYMER WAVEGUIDE DISPOSED ON THE MODULE   │
│                             806                             │
└─────────────────────────────────────────────────────────────┘
                              │
                              ▼
┌─────────────────────────────────────────────────────────────┐
│     COUPLE FIRST, SECOND, THIRD, AND FOURTH LIGHT WAVE      │
│  CARRIERS FROM THE POLYMER WAVEGUIDE INTO A FIRST SILICON   │
│      WAVEGUIDE DISPOSED ON A FIRST INTEGRATED CIRCUIT       │
│                             808                             │
└─────────────────────────────────────────────────────────────┘
                              │
                              ▼
                         ( FIG. 8B )
```

COUPLE THE FIRST LIGHT WAVE CARRIER TO A FIRST LIGHT SENSING DEVICE DISPOSED ON THE FIRST INTEGRATED CIRCUIT TO RECEIVE THE CA INFORMATION FROM THE FIRST LIGHT WAVE CARRIER
810

COUPLE THE SECOND LIGHT WAVE CARRIER TO A SECOND LIGHT SENSING DEVICE DISPOSED ON THE FIRST INTEGRATED CIRCUIT TO RECEIVE THE TIMING INFORMATION FROM THE SECOND LIGHT WAVE CARRIER
812

COUPLE THE THIRD AND FOURTH LIGHT WAVE CARRIERS BACK FROM THE FIRST SILICON WAVEGUIDE INTO THE POLYMER WAVEGUIDE
814

COUPLE THE THIRD AND FOURTH LIGHT WAVE CARRIERS RECEIVED BACK FROM THE FIRST SILICON WAVEGUIDE INTO A SECOND SILICON WAVEGUIDE DISPOSED ON A SECOND INTEGRATED CIRCUIT
816

COUPLE THE THIRD LIGHT WAVE CARRIER TO A THIRD LIGHT SENSING DEVICE DISPOSED ON THE SECOND INTEGRATED CIRCUIT TO RECEIVE THE CA INFORMATION
818

COUPLE THE FOURTH LIGHT WAVE CARRIER TO A FOURTH LIGHT SENSING DEVICE DISPOSED ON THE SECOND INTEGRATED CIRCUIT TO RECEIVE THE TIMING INFORMATION FROM THE FOURTH LIGHT WAVE CARRIER
820

*FIG. 8B*

BUS DISTRIBUTION USING MULTIWAVELENGTH MULTIPLEXING

BRIEF DESCRIPTION OF THE DRAWINGS

FIG. 7 is a flowchart illustrating multiwavelength bus synchronization.

FIGS. 8A-8B are a flowchart illustrating multiwavelength bus communication and synchronization.

DETAILED DESCRIPTION OF THE EMBODIMENTS

In an embodiment, command/address and timing information is distributed to buffer integrated circuits on a module using multiple wavelengths of light modulated with the same information. Each individual wavelength of modulated light carrying command/address information is received by a corresponding single buffer device that deserializes the command/address information and communicates it electrically to memory devices(s). Likewise, each individual wavelength of modulated light carrying timing/synchronization/clock information is received by a corresponding single buffer device and used to synchronize accesses to the memory device(s). Thus, multiple buffer integrated circuits on a module each receive information from a memory controller, host, or other device using different wavelengths of light transmitted on the same waveguide.

In an embodiment, wavelength resonant ring couplers disposed on the buffer integrated circuits are used to separate the wavelength being received by a particular buffer integrated circuit from the wavelengths of light destined for other buffer integrated circuits on the same waveguide. In this manner, multidrop and concurrent, reception of command/address and timing (clock) information between memory controller, host, or other device, and buffer integrated circuit is accomplished.

Figure 1:
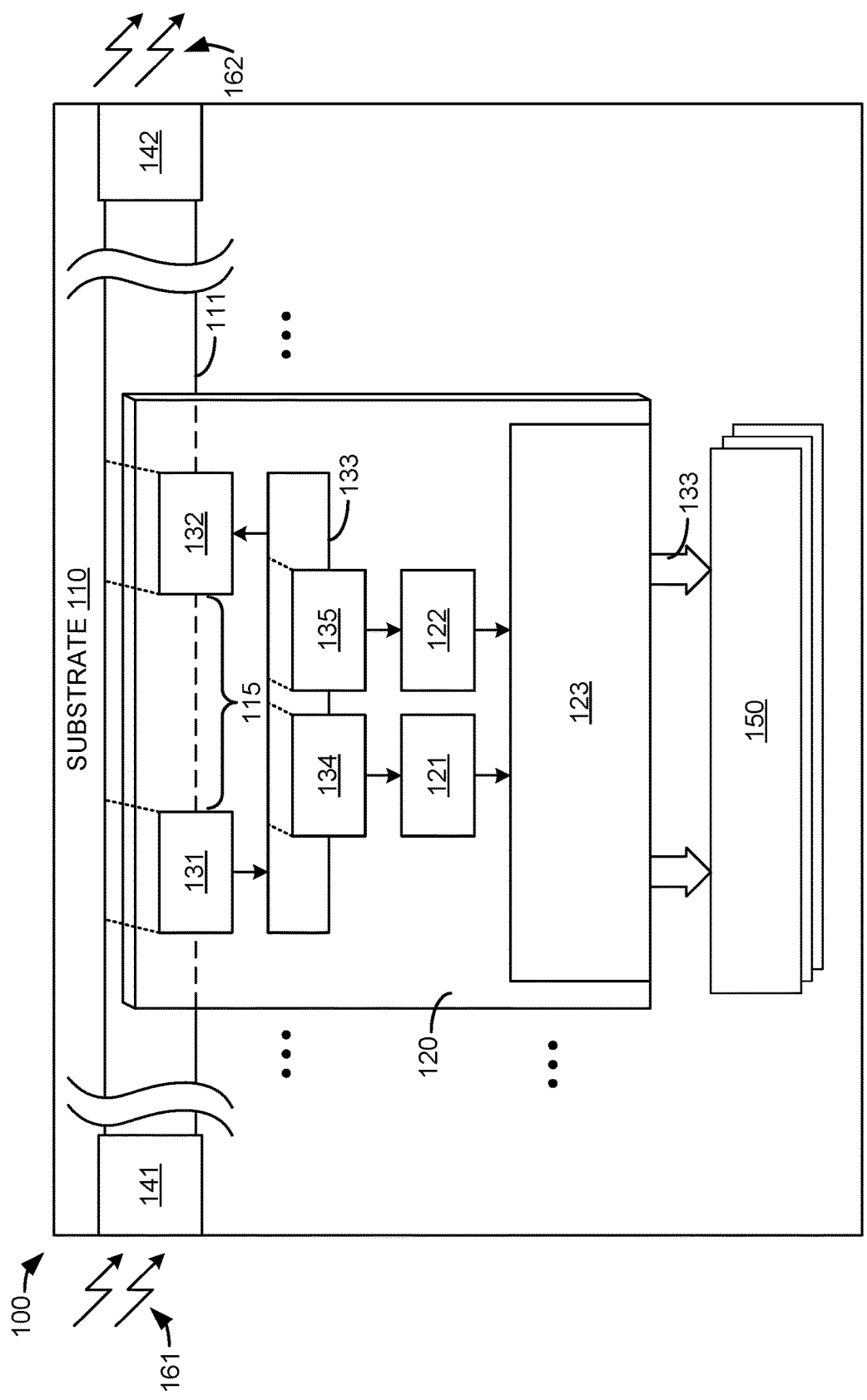
FIG. 1 is a block diagram illustrating an optical module.

FIG. 1 is a block diagram illustrating an optical module. In FIG. 1, module 100 comprises substrate 110, polymer waveguide 111, buffer die 120, input optical connection 141, output optical connection 142, and integrated circuit(s) 150. Buffer die 120 includes optical-to-electrical (OE) converters 121-122, electrical circuitry 123, silicon (Si) waveguide 133, wavelength selective optical coupler 134, and wavelength selective optical coupler 135.

In operation, module 100 receives light 161 via optical connection 141. Light 161 may be provided by a host system (not shown if FIG. 1). In an embodiment, light 161 comprises multiple wavelengths of light that are each modulated (e.g., by a host system) to carry information. It should be understood that this is a form of frequency division multiplexing where each frequency of light (wavelength) is modulated and may carry information independent of the other frequencies of light. Because no light source is perfect, and modulation necessarily broadens the spectrum of even a single frequency light signal, as used herein, 'frequency of light' or 'frequencies of lights' refers to a relatively narrow range of light frequencies (or wavelengths) around a center frequency (or wavelength) that is distinguishable from other relatively narrow ranges of light frequencies centered around other center frequencies.

In an embodiment, a first wavelength of light 161 is modulated with command/address information and a second, different, wavelength of light 161 is modulated with synchronization/timing/clock information and/or pulses. Light 161 is coupled into polymer waveguide 111 by optical connection 141. Once coupled into polymer waveguide 111, light 161 propagates along polymer waveguide 111 from left to right in FIG. 1. When light 161 propagating along polymer waveguide 111 reaches optical coupler 131, light 161 is substantially coupled from polymer waveguide 111 into Si waveguide 133 by optical coupler 131.

In an embodiment, optical coupler 131 is a tapered silicon waveguide that is in direct contact with polymer waveguide 111. Thus, in an embodiment, buffer die 120 is flip-chip bonded to substrate 110 such that a tapered section of optical coupler 131 is in direct contact with polymer waveguide 111 leading to adiabatic transfer of light from polymer waveguide 111 to Si waveguide 133. This adiabatic transfer leads to a substantially dark section 115 of polymer waveguide 111.

Once coupled into Si waveguide 133, light 161 propagates along Si waveguide 133 from left to right in FIG. 1. When light 161 propagating along Si waveguide 133 reaches wavelength selective optical coupler 134, a first single frequency of light (e.g., first wavelength of light carrying command/address information) of multiwavelength light 161 is substantially diverted from Si waveguide 133 by wavelength selective optical coupler 134. When light 161 propagating along Si waveguide 133 reaches wavelength selective optical coupler 135, a second single frequency of light (e.g., second wavelength of light carrying synchronization information) of multiwavelength light 161 is substantially diverted from Si waveguide 133 by wavelength selective optical coupler 135. The other frequencies of light of multiwavelength light 161 continue to propagate from left to right along Si waveguide 133. When the remaining bands of multiwavelength light 161 reach optical coupler 132, the remaining wavelengths of light 161 are substantially coupled back from Si waveguide 133 into polymer waveguide 111 by optical coupler 132.

In an embodiment, optical coupler 132 is a tapered silicon waveguide that is direct contact with polymer waveguide 111. Thus, in an embodiment, buffer die 120 is flip-chip bonded to substrate 110 such that a tapered section of optical coupler 132 is in direct contact with polymer waveguide 111 leading to adiabatic transfer of light from Si waveguide 133 to polymer waveguide 111. This adiabatic transfer ends the substantially dark section 115 of polymer waveguide 111.

Once coupled back into polymer waveguide 111, the remaining bands of light 161 propagate along polymer waveguide 111 from left to right in FIG. 1 until (a) the remaining wavelengths of light 161 (if any) exit module 100 via optical connection 142 as light 162; or (b) another buffer die (not shown in FIG. 1) receives the remaining wavelengths of light 161 and selectively diverts a different two wavelengths of light 161.

The first frequency of light of multiwavelength light 161 that was substantially diverted from Si waveguide 133 by wavelength selective optical coupler 134 is directed to optical to electrical converter 121. Optical to electrical converter 121 demodulates the command/address information being carried by the diverted first wavelength of light 161 and provides it to electrical circuitry 123. The second frequency of light of multiwavelength light 161 that was substantially diverted from Si waveguide 133 by wavelength selective optical coupler 135 is directed to optical to electrical converter 122. Optical to electrical converter 122 demodulates the synchronization information being carried by the diverted second wavelength of light 161 and provides it to electrical circuitry 123.

Electrical circuitry 123 processes the command/address and synchronization information demodulated from light 161. Electrical circuitry 123 may provide some or all of the demodulated information to additional integrated circuit(s) (e.g., integrated circuit 150) that are part of module 100. Electrical circuitry 123 may also receive data/information/signals/etc. from additional integrated circuit(s) (e.g., integrated circuit 150) that are part of module 100. In an embodiment, additional integrated circuit 150 include one or more memory devices. For example, additional integrated circuit(s) 150 may include devices with memory arrays comprising dynamic random access memory (DRAM) arrays, static random access memory (SRAM) arrays, non-volatile memory arrays (such as flash), conductive bridging random access memory (CBRAM—a.k.a., programmable metallization cell—PMC), resistive random access memory (a.k.a., RRAM or ReRAM), or magnetoresistive random-access memory (MRAM), and the like, and/or combinations thereof.

Figure 2A:
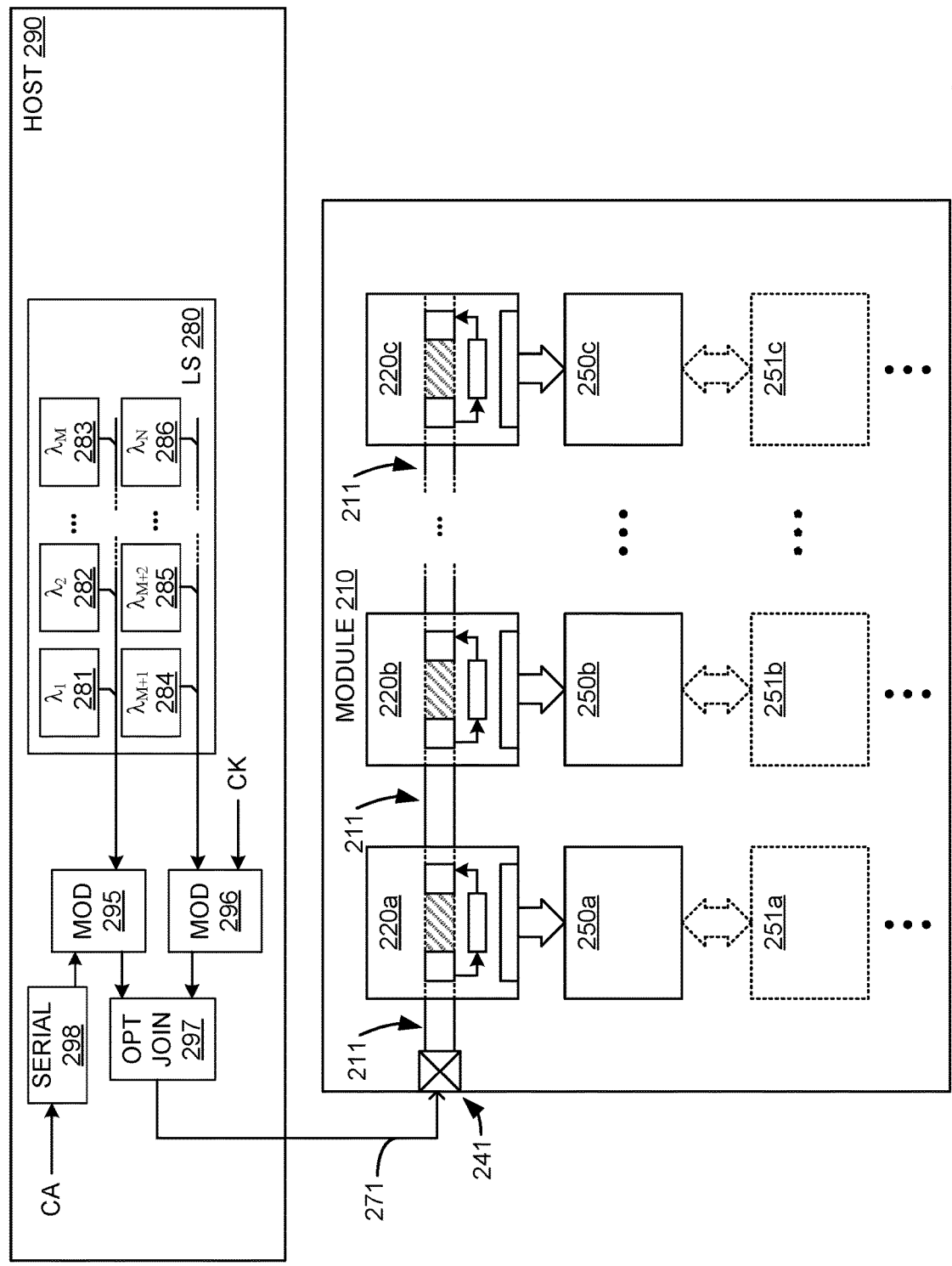
FIGS. 2A-2C illustrate a system with a bus distributed using multiwavelength multiplexing.
Figure 2B:
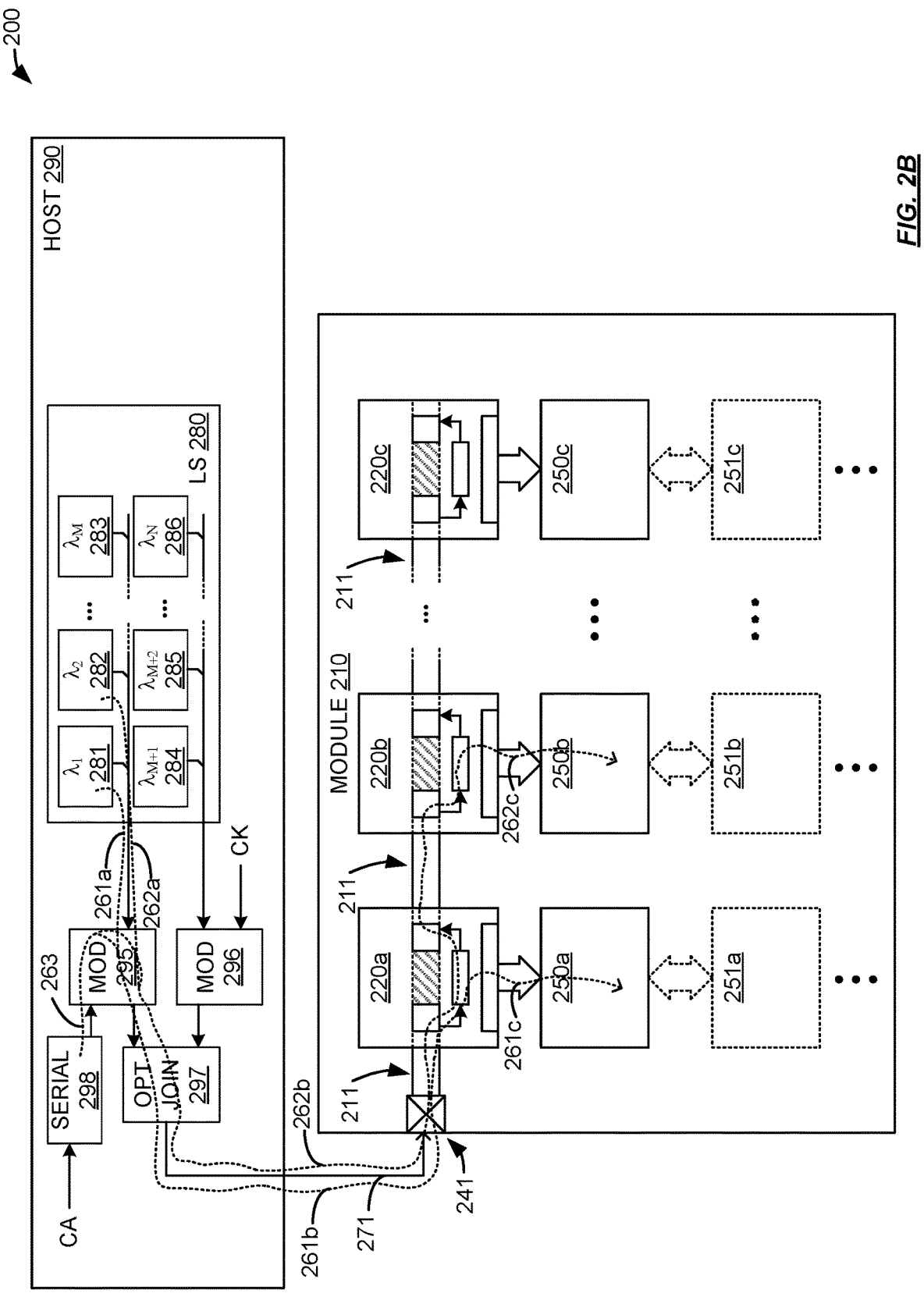
Figure 2C:
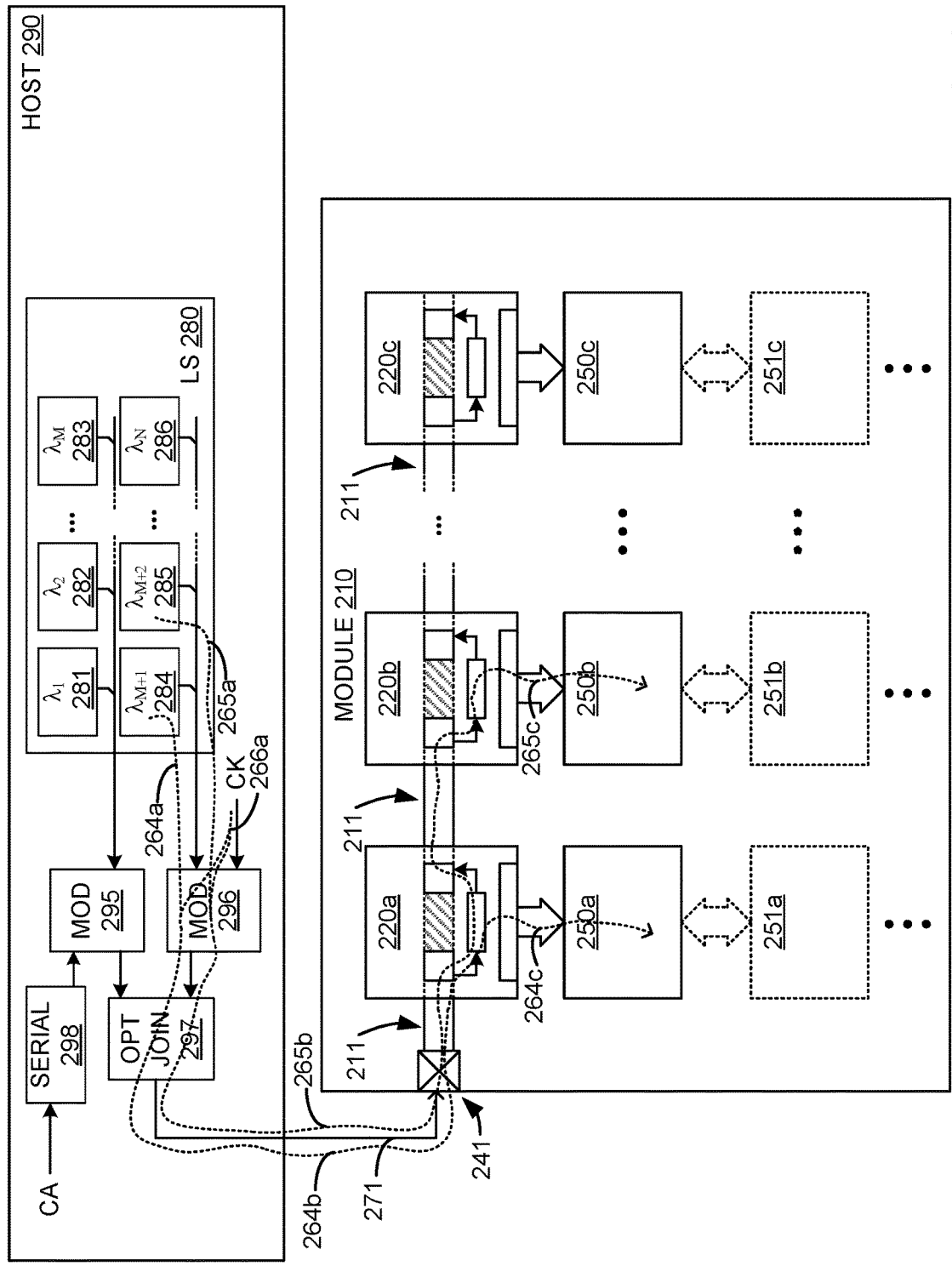

FIGS. 2A-2C illustrate a system with a bus distributed using multiwavelength multiplexing. In FIGS. 2A-2C, system 200 comprises host 290, module 210, and optical link 271. Module 210 includes polymer waveguide 211, buffer integrated circuits (buffers) 220a-220c, and optical interface 241. Optical link 271 operatively couples host 290 to module 210 via optical interface 241. Buffers 220a-220c are electrically coupled to integrated circuits 250a-250c, respectively. Buffers 220a-220c may be electrically coupled to additional integrated circuits 251a-251c, respectively.

Host 290 includes light source 280, optical modulator 295, optical modulator 296, optical joiner 297, and serializer 298. Light source 280 produces light with N number of light wave carriers 281-286 having unique wavelengths $\lambda_1$-$\lambda_N$. Light source 280 couples a first M number of unmodulated light wavelengths $\lambda_1$-$\lambda_M$ (first group of light wave carriers 281-283) to optical modulator 295. Light source 280 couples N-M number of unmodulated light wavelengths $\lambda_{M+1}$-$\lambda_N$ (second group of light wave carriers 284-286) to optical modulator 296. In an embodiment, M equals N-M. In an embodiment M and N-M equal five (5).

Serializer 298 receives parallel command/address (CA) signals and outputs a serial bitstream of the CA signals to optical modulator 295. Optical modulator modulates each of the wavelengths $\lambda_1$-$\lambda_M$ of light in the first group of light wave carriers 281-283 with the serial bitstream from serializer 298. Thus, each modulated wavelength $\lambda_1$-$\lambda_M$ of light in the first group of light wave carriers 281-283 individually carries the same CA information.

Optical modulator 295 receives synchronization information (CK). Optical modulator modulates each of the wavelengths $\lambda_{M+1}$-$\lambda_N$ of light in the second group of light wave carriers 284-286 with the synchronization information CK. Thus, each modulated wavelength $\lambda_{M+1}$-$\lambda_N$ of light in the second group of light wave carriers 284-286 individually carries the same synchronization information CK.

Buffers 220a-220c are operatively coupled to polymer waveguide 211 to receive the modulated light wave carriers 281-286. Each of buffers 220a-220c couples the modulated first group of light wave carriers 281-283 from host 290 into an on-chip silicon (Si) waveguide, selectively redirects at least a first modulated light wave carrier (e.g., modulated light wave carrier 281) from the first group of light wave carriers 281-283 to a first on-chip optical-to-electrical converter, and returns the remaining modulated light wavelength(s) (if any) from the first group of light wave carriers 281-283 to polymer waveguide 211. Each of buffers 220a-220c also couples the modulated second group of light wave carriers 284-286 from host 290 into the on-chip silicon waveguide, selectively redirects at least a second modulated light wave carrier (e.g., modulated light wave carrier 284) from the second group of light wave carriers 284-286 to a second on-chip optical-to-electrical converter, and returns the remaining modulated light wavelength(s) (if any) from the second group of light wave carriers 284-286 to polymer waveguide 211.

In FIGS. 2A-2C, buffers 220a-220c are disposed from left to right along polymer waveguide 211 in the respective order buffer 220a to buffer 220c. Thus, each of buffers 220a-220c are sequentially and operatively coupled to polymer waveguide 211. In other words, buffer 220a receives light carried by polymer waveguide 211 from optical interface 241 without any intervening buffers 220b-220c. Buffer 220b receives light from polymer waveguide 211 after the light has been coupled into buffer 220a and coupled back from buffer 220a and some wavelengths of light (e.g., $\lambda_1$ 281 and $\lambda_{M+1}$ 284) have been redirected by buffer 220a. This pattern continues until buffer 220c receives light (e.g., $\lambda_M$ 283 and $\lambda_N$ 286) from a buffer (not shown in FIGS. 2A-2C) that is immediately to the left of buffer 220c where the other wavelengths of light have been redirected by the intervening buffers 220a-220b etc.

From the foregoing, it should be understood that CA information and synchronization information may be transmitted from host 290 via optical link 271, optical interface 241, polymer waveguide 211, and buffer 220a to integrated circuit(s) 250a-251a using two or more modulated wavelengths of light. Likewise, information CA information and synchronization information may be transmitted from host 290 via optical link 271, optical interface 241, polymer waveguide 211, buffer 220a (and any intervening buffers 220a-220c along polymer waveguide 211) to integrated circuit(s) 250b-251b and/or integrated circuit(s) 250c-251c using two or more modulated wavelengths of light per buffer 220a-220c.

In an embodiment, integrated circuits 250a-250c may be memory devices. For example, integrated circuits 250a-250c may be dynamic random access memories. In other embodiments, integrated circuits may be or comprise, but are not limited to, SRAM, DDR3, DDR4, DDR5, DDR6, XDR, XDR2, GDDR3, GDDR4, GDDR5, GDDR6, GDDR6X, HBM, HBM2, HBM3, LPDDR3, LPDDR4, and/or LPDDR5 and successor memory standards and technologies. Integrated circuits 250a-250c may include a stack of devices either connected with wire bonds such as DDP DRAM or connected as a through-silicon-via (TSV) stack such as hybrid memory cube (HMC), 3DS DRAM or HBM DRAM.

FIG. 2B illustrates the flow of CA information from host 290 to integrated circuits 250a-250b. A first light wave carrier 281 and a second light wave carrier 282 are generated by light source 280 and provided to modulator 295. The first light wave carrier 281 and a second light wave carrier 282 are modulated with CA information by modulator 295. This is illustrated in FIG. 2B by dashed arrows 261a-262a respectively running from first light wave carrier 281 and second light wave carrier 282 in light source 280 and both joining with arrow 263 from serializer 298 in modulator 295. The first light wave carrier 281 and a second light wave carrier 282, as modulated with CA information, are transmitted via optical link 271. This is illustrated in FIG. 2B by arrows 261a-261b exiting modulator 295, passing through optical joiner 297, exiting host 290, and proceeding along optical link 271, through optical interface 241, and into polymer waveguide 211. Buffer 220a couples both wavelengths of modulated light into an on-chip silicon waveguide.

Buffer 220a diverts the light wave carrier 281 having a first wavelength $\lambda_1$ of modulated light. Buffer 220a couples the second light wave carrier 282 of modulated light back into polymer waveguide 211. Buffer 220a converts the diverted first light wave carrier 281 having the first wavelength $\lambda_1$ of modulated light to electrical signals corresponding to the CA information transmitted by host 290 on the first light wave carrier 281 having the first wavelength $\lambda_1$. The CA information transmitted by host 290 on the light wave carrier 281 having first wavelength $\lambda_1$, now in the form of electrical signals, is provided to integrated circuit 250a via an electrical interface. This is illustrated in FIG. 2B by arrow 261c.

The second light wave carrier 282 of modulated light that was coupled back into polymer waveguide 211 by buffer 220a is coupled by buffer 220b into an on-chip silicon waveguide. Buffer 220b diverts the modulated second light wave carrier 282. Buffer 220b couples the remaining modulated light (if any) back into polymer waveguide 211. Buffer 220b converts the diverted second light wave carrier 282 of modulated light to electrical signals corresponding to the information transmitted by host 290 on the second light wave carrier 282. The CA information transmitted by host 290 on the second light wave carrier 282, now in the form of electrical signals, is provided to integrated circuit 250b via an electrical interface. This is illustrated in FIG. 2B by arrow 262c.

FIG. 2C illustrates the flow of synchronization/timing/clock information from host 290 to integrated circuits 250a-250b. A third light wave carrier 284 and a fourth light wave carrier 285 are generated by light source 280 and provided to modulator 296. The third light wave carrier 284 and a fourth light wave carrier 285 are modulated with synchronization/timing/clock (CK) information by modulator 296. This is illustrated in FIG. 2C by dashed arrows 264a-265a respectively running from third light wave carrier 284 and fourth light wave carrier 285 in light source 280 and both joining, in modulator 296, with arrow 266 from CK. The third light wave carrier 284 and a fourth light wave carrier 285, as modulated with CK information, are transmitted via optical link 271. This is illustrated in FIG. 2C by arrows 264b-265b exiting modulator 295, passing through optical joiner 297, exiting host 290, and proceeding along optical link 271, through optical interface 241, and into polymer waveguide 211. Buffer 220a couples both wavelengths of modulated light into an on-chip silicon waveguide.

Buffer 220a diverts the modulated third light wave carrier 284. Buffer 220a couples the modulate fourth light wave carrier 285 back into polymer waveguide 211. Buffer 220a converts the diverted third light wave carrier 284 to electrical signals corresponding to the CK information transmitted by host 290 on the third light wave carrier 284. The CK information transmitted by host 290 on the third light wave carrier 284, now in the form of electrical signals, is provided to integrated circuit 250a via an electrical interface. This is illustrated in FIG. 2C by arrow 264c.

The modulate fourth light wave carrier 285 that was coupled back into polymer waveguide 211 by buffer 220a is coupled by buffer 220b into an on-chip silicon waveguide. Buffer 220b diverts the modulate fourth light wave carrier 285. Buffer 220b couples the remaining modulated light (if any) back into polymer waveguide 211. Buffer 220b converts the diverted fourth light wave carrier 285 to electrical signals corresponding to the CK information transmitted by host 290 on the fourth light wave carrier 285. The information transmitted by host 290 on the fourth light wave carrier 285, now in the form of electrical signals, is provided to integrated circuit 250b via an electrical interface. This is illustrated in FIG. 2C by arrow 265c.

Figure 3A:
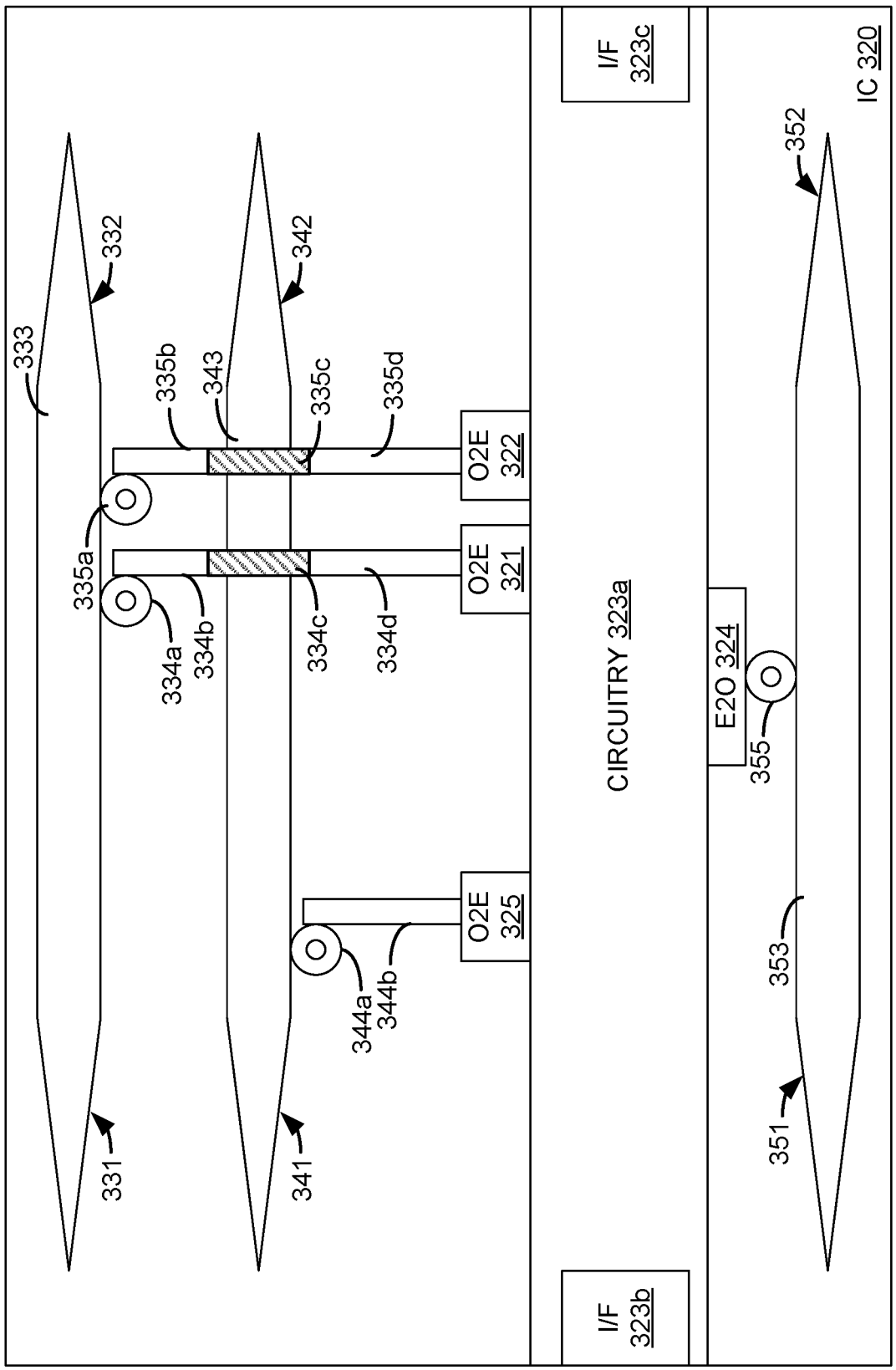
FIGS. 3A-3C illustrate an integrated circuit floorplan.
Figure 3B:
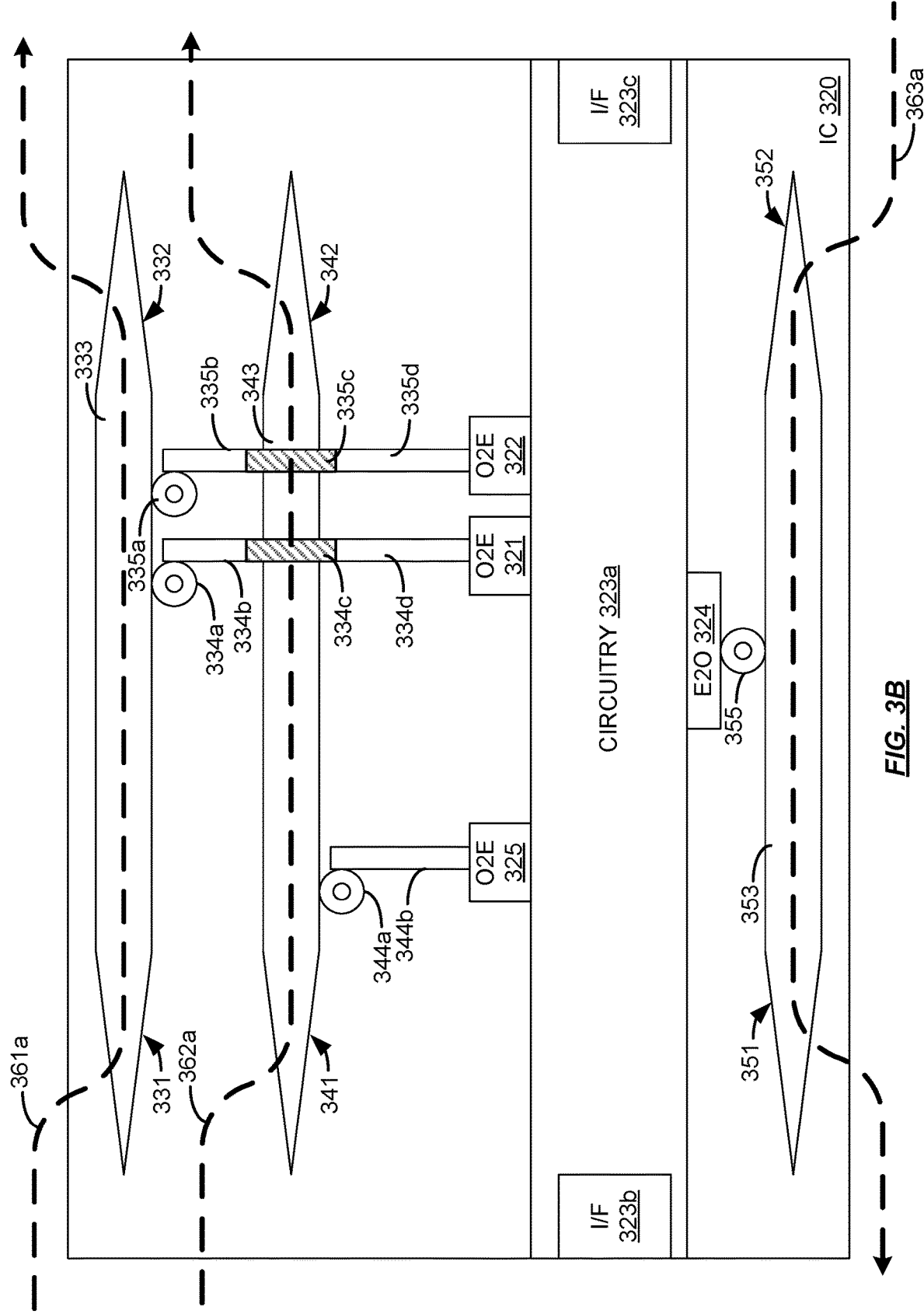
Figure 3C:
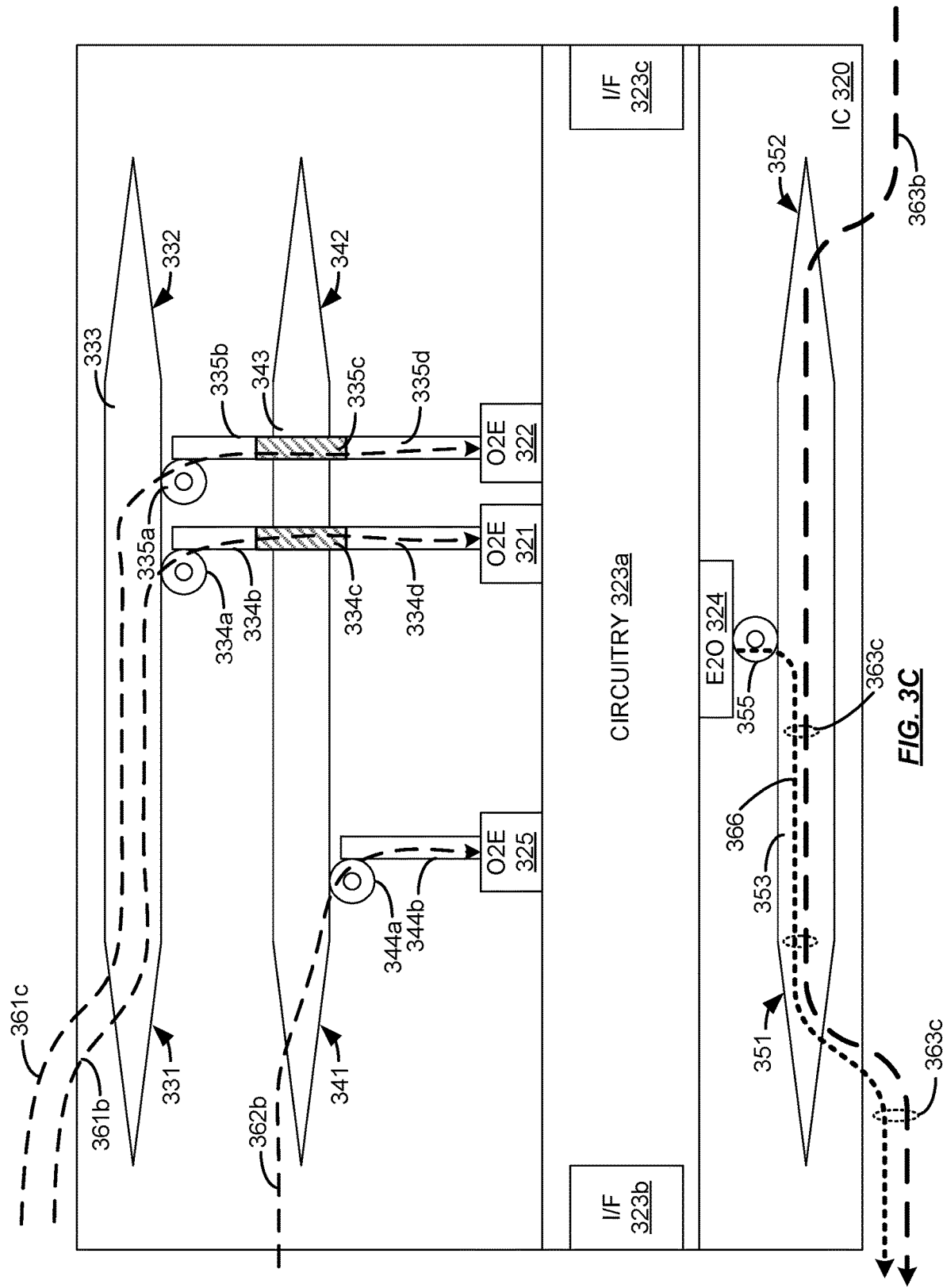

FIGS. 3A-3C illustrate an integrated circuit floorplan. The elements illustrated in FIGS. 3A-3C may be part of, for example, buffer die 120, and/or buffers 220a-220c. In FIGS. 3A-3C, integrated circuit 320 includes electrical circuitry 323a, optical-to-electrical converter 321, optical-to-electrical converter 322, optical-to-electrical converter 325, electrical-to-optical converter 324, silicon waveguide 333, silicon waveguide 343, silicon waveguide 353, wavelength resonant ring coupler 334a, waveguide 334b, optical crossover 334c, waveguide 334d, wavelength resonant ring coupler 335a, waveguide 335b, optical crossover 335c, waveguide 335d, and wavelength resonant ring modulator 355. Electrical circuitry 323a includes electrical interface 323b and electrical interface 323c. Silicon waveguide 333 includes tapered coupler section 331 and tapered coupler section 332. Silicon waveguide 343 includes tapered coupler section 341 and tapered coupler section 342. Silicon waveguide 353 includes tapered coupler section 351 and tapered coupler section 352.

In operation, modulated light having at least two wavelengths respectively carrying CA information and synchronization information from a host is coupled from a first polymer waveguide into silicon waveguide 333 by tapered coupler section 331. If a given wavelength of light is not resonant with wavelength resonant ring coupler 334a or wavelength resonant ring coupler 335a, that wavelength of light travels along silicon waveguide 333 until it is coupled back to the first polymer waveguide by tapered coupler section 332. This is illustrated in FIG. 3B by arrow 361a entering silicon waveguide 333 in tapered coupler section 331 and exiting silicon waveguide 333 in tapered coupler section 332.

Modulated light having at least two wavelengths carrying data (DQ) information from a host is coupled from a second polymer waveguide into silicon waveguide 343 by tapered coupler section 341. If a given wavelength of light is not resonant with wavelength resonant ring coupler 344a, that wavelength of light travels along silicon waveguide 343 until it is coupled back to the second polymer waveguide by tapered coupler section 342. This is illustrated in FIG. 3B by arrow 362a entering silicon waveguide 343 in tapered coupler section 341 and exiting silicon waveguide 343 in tapered coupler section 342.

Unmodulated light from a host is coupled from a third polymer waveguide into silicon waveguide 353 by tapered coupler section 351. If a given wavelength of light is not resonant with wavelength resonant ring modulator 355, that wavelength of light travels along silicon waveguide 353 until it is coupled back to the third polymer waveguide by tapered coupler section 352. This is illustrated in FIG. 3B by arrow 363a entering silicon waveguide 353 in tapered coupler section 352 and exiting silicon waveguide 353 in tapered coupler section 351.

If a first wavelength of light carrying CA information, from a memory controller, host, or other device, is resonant with wavelength resonant ring coupler 334a and is coupled into silicon waveguide 333 (e.g., from the first polymer waveguide), the first wavelength of light is coupled from silicon waveguide 333 to waveguide 334b by wavelength resonant ring coupler 334a. Waveguide 334b, optical crossover 334c, and waveguide 334d carry the diverted first wavelength to optical-to-electrical converter 321. This is illustrated in FIG. 3C by arrow 361b entering silicon waveguide 333 in tapered coupler section 331, flowing through ring coupler 334a, entering waveguide 334b, passing through optical crossover 334c, passing through waveguide 334d, and terminating at optical-to-electrical converter 321. Optical-to-electrical converter 321 is operatively coupled to electrical circuitry 323a to provide electrical signals corresponding to the CA information carried by the first wavelength of light to electrical circuitry 323a. The CA information carried by the first wavelength of light may be relayed or otherwise processed by electrical circuitry 323a and then provided to other integrated circuits (not shown in FIGS. 3A-3C) via electrical interface 323b and/or electrical interface 323c.

If a second wavelength of light carrying synchronization information, from the memory controller, host, or other device, is resonant with wavelength resonant ring coupler 335a and is coupled into silicon waveguide 333 (e.g., from the first polymer waveguide), the second wavelength of light is coupled from silicon waveguide 333 to waveguide 335b by wavelength resonant ring coupler 335a. Waveguide 335b, optical crossover 335c, and waveguide 335d carry the diverted second wavelength to optical-to-electrical converter 322. This is illustrated in FIG. 3C by arrow 361c entering silicon waveguide 333 in tapered coupler section 331, flowing through ring coupler 335a, entering waveguide 335b, passing through optical crossover 335c, passing through waveguide 335d, and terminating at optical-to-electrical converter 322. Optical-to-electrical converter 321 is operatively coupled to electrical circuitry 323a to provide electrical signals corresponding to the synchronization information carried by the second wavelength of light to electrical circuitry 323a. The synchronization information carried by the second wavelength of light may be relayed or otherwise processed by electrical circuitry 323a and then provided to other integrated circuits (not shown in FIGS. 3A-3C) via electrical interface 323b and/or electrical interface 323c.

A wavelength of light carrying data information, from the memory controller, host, or other device, that is resonant with wavelength resonant ring coupler 344a is coupled into silicon waveguide 343 (e.g., from the second polymer waveguide), that wavelength of light is coupled from silicon waveguide 343 to waveguide 344b by wavelength resonant ring coupler 344a. Waveguide 344b, carries the diverted wavelength to optical-to-electrical converter 325. This is illustrated in FIG. 3C by arrow 362b entering silicon waveguide 343 in tapered coupler section 341, flowing through wavelength resonant ring coupler 344a, entering waveguide 344b, and terminating at optical-to-electrical converter 325. Optical-to-electrical converter 325 is operatively coupled to electrical circuitry 323a to provide electrical signals corresponding to the data information carried by the diverted wavelength of light to electrical circuitry 323a. The data information carried by the diverted wavelength of light may be relayed or otherwise processed by electrical circuitry 323a and then provided to other integrated circuits (not shown in FIGS. 3A-3C) via electrical interface 323b and/or electrical interface 323c.

An unmodulated wavelength of light 363b (e.g., from the third polymer waveguide, and possibly accompanied by other modulated and/or unmodulated wavelengths of light not shown in FIG. 3C) that is resonant with wavelength resonant ring modulator 355 is coupled into silicon waveguide 353 by tapered coupler section 352. This resonant wavelength of light is modulated by signals from electrical circuitry 323a by a combination of electrical-to-optical converter 324 and wavelength resonant ring modulator 355. Silicon waveguide 353 carries the modulated light until it exits silicon waveguide 353 in tapered coupler section 351. This is illustrated in FIG. 3C by arrow 363b entering silicon waveguide 353 in tapered coupler section 352, proceeding to wavelength resonant ring modulator 355, joining with arrow 366 (which represents modulated information) at ring modulator 355 thereby becoming bound with arrow 366 becoming modulated light carrier 363c. Modulated light carrier 363c then exits silicon waveguide 353 in tapered coupler section 351.

Figure 4:
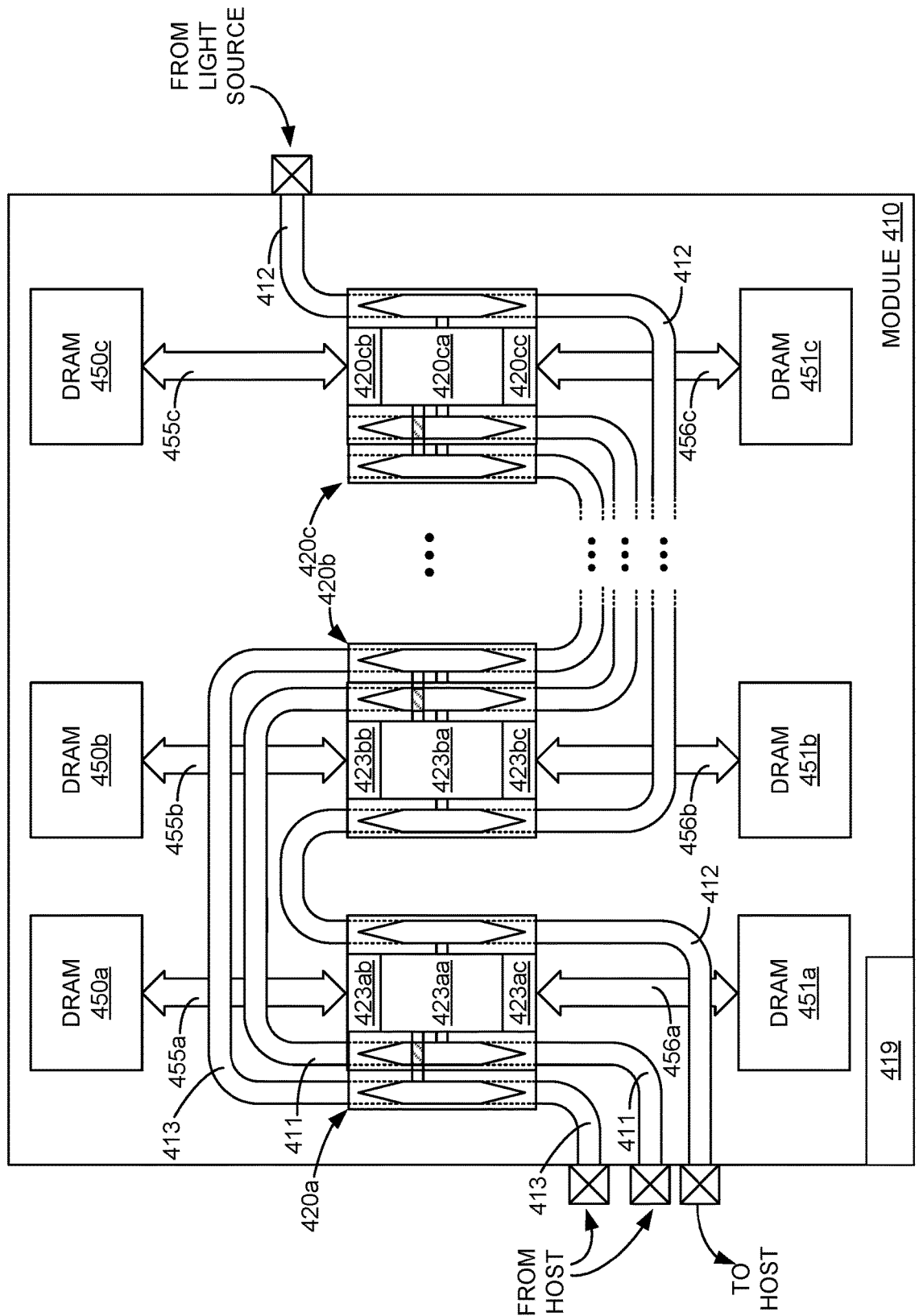
FIG. 4 is an example module floorplan compatible with an optical input/output memory module.

FIG. 4 is an example module floorplan compatible with an optical input/output memory module. In FIG. 4, memory module 410 comprises write data waveguide 411, read data waveguide 412, command/address (CA) waveguide 413, buffer integrated circuits 420a-420c, DRAMs 450a-450c, DRAMs 451a-451c, electrical interconnect 455a-455c, and electrical interconnect 456a-456c. Buffer integrated circuits 420a-420c respectively include electrical circuitry 423aa-423ca, interface 423ab-423cb, interface 423ac-423cc, and miscellaneous, side channel, and/or power interface 419.

Buffer integrated circuits 420a-420c are operatively coupled via data waveguide 411 and command/address optical waveguide 413 in a daisy chain topology running from 420a as the leftmost buffer integrated circuit in FIGS. 4 to 420c as the rightmost buffer integrated circuit in FIG. 4. In other words, modulated light carrying data information from a host is coupled into data waveguide 411. Then the data carrying light is coupled into buffer integrated circuit 420a. The data carrying light is optionally received and/or diverted by buffer integrated circuit 420a. Then buffer integrated circuit 420a couples the remaining data carrying light back into data waveguide 411.

Similarly, modulated light carrying command/address and synchronization information from a host is coupled into CA waveguide 413. Then the command/address and synchronization carrying light is coupled into buffer integrated circuit 420a. The command/address and synchronization carrying light is optionally received and/or diverted by buffer integrated circuit 420a. Then buffer integrated circuit 420a couples the remaining command/address and synchronization carrying light back into CA waveguide 413.

After buffer integrated circuit 420a, the remaining data carrying light is coupled into buffer integrated circuit 420b. The data carrying light is optionally received and/or diverted by buffer integrated circuit 420b. Then buffer integrated circuit 420b couples the remaining data carrying light back into data waveguide 411. This daisy chaining proceeds (e.g., for 5 or 10 total buffer devices) until the remaining data carrying light is coupled into buffer integrated circuit 420c and the data carrying light is optionally received and/or diverted by buffer integrated circuit 420c. Any remaining light (if any) is not provided to additional integrated circuits by data waveguide 411.

Similarly, after buffer integrated circuit 420a, the remaining command/address and synchronization carrying light is coupled into buffer integrated circuit 420*b*. The command/address and synchronization carrying light is optionally received and/or diverted by buffer integrated circuit 420*b*. Then buffer integrated circuit 420*b* couples the remaining command/address and synchronization carrying light back into CA waveguide 413. This daisy chaining proceeds (e.g., for 5 or 10 total buffer devices) until the remaining command/address and synchronization carrying light is coupled into buffer integrated circuit 420*c* and the command/address and synchronization carrying light is optionally received and/or diverted by buffer integrated circuit 420*c*. Any remaining light (if any) is not provided to additional integrated circuits by CA waveguide 413.

Buffer integrated circuits 420*a*-420*c* are operatively coupled via optical waveguide 412 in a daisy chain topology running from 420*c* as the rightmost buffer integrated circuit in FIGS. 4 to 420*a* as the leftmost buffer integrated circuit in FIG. 4. In other words, unmodulated multiwavelength light is coupled into waveguide 412. Then the unmodulated light is coupled into buffer integrated circuit 420*c*. The light is optionally modulated by buffer integrated circuit 420*c*. Then buffer integrated circuit 420*c* couples the modulated and unmodulated light back into waveguide 412. This daisy chaining proceeds (e.g., for 5 or 10 total buffer devices) until the modulated and unmodulated light is coupled into and then back from buffer integrated circuit 420*a*. The modulated light emerging from buffer integrated circuit 420*a* is provided to a host. Thus, it should be understood that the optical waveguides 411-413 forming the optical interconnect among buffer integrated circuits 420*a*-420*c* run substantially with a horizontal orientation.

In FIG. 4, DRAMs 450*a*-450*c* are illustrated as operatively coupled electrically to respective buffer integrated circuits 420*a*-420*c*, via respective interfaces 423*ab*-423*cb*, using a vertical orientation of interconnects 455*a*-455*b*. DRAMs 451*a*-451*c* are illustrated as operatively coupled electrically to respective buffer integrated circuits 420*a*-420*c*, via respective interfaces 423*ac*-423*cc*, using a vertical orientation of interconnects 456*a*-456*b*. Thus, it should be understood that electrical connections between buffer integrated circuits 420*a*-420*c* and the respective ones DRAMs 450*a*-450*c* 451*a*-451*c* run predominately perpendicular to waveguides 411-413.

Since each coupling in and out of silicon waveguides and each passing through a ring resonator or modulator causes some reduction of the light intensity (insertion loss), a module 410 might use more than one daisy chain for input and output. E.g., ten buffer integrated circuits 420*a*-420*c*, e.g., for a multiple of ten memory devices, could be connected five each to two pairs of input and output polymer waveguides and ten buffer integrated circuits 420*a*-420*c*, e.g., for a multiple of ten memory devices.

Figure 5:
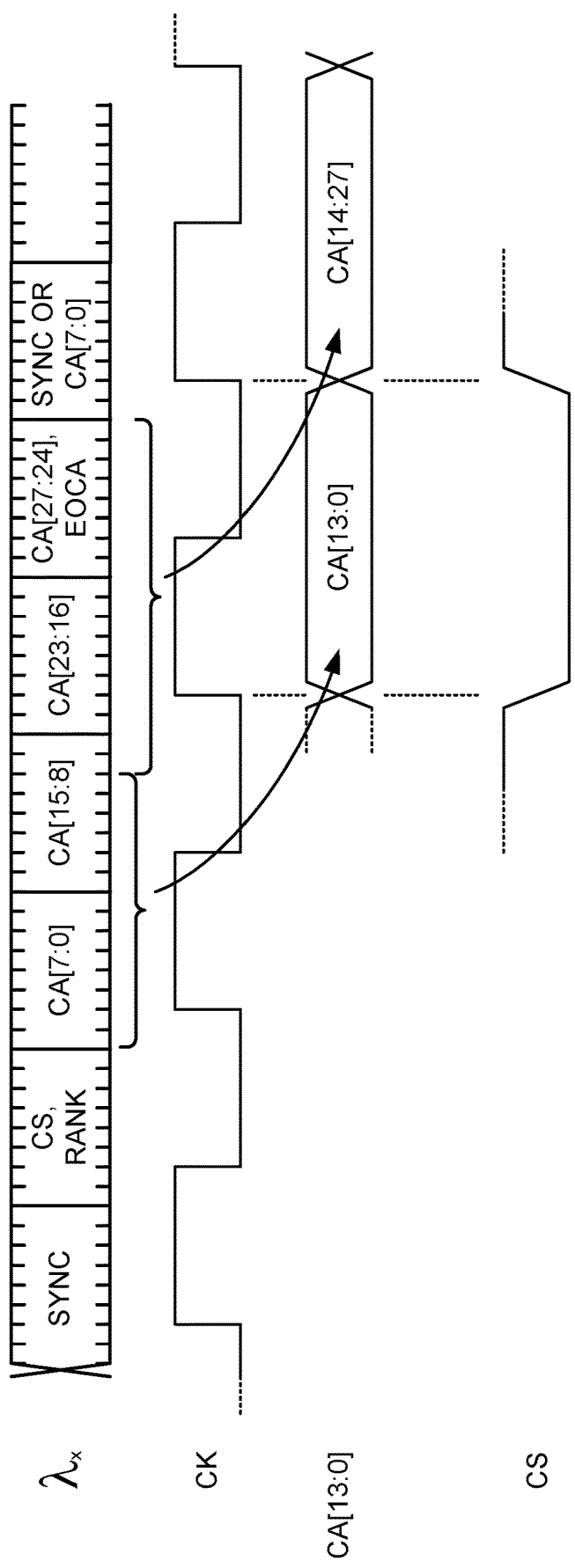
FIG. 5 is an example timing diagram illustrating optical to electrical bus communication.

FIG. 5 is an example timing diagram illustrating optical to electrical bus communication. In FIG. 5, the serial command/address information bitstream on a single wavelength (XX) is illustrated. The electrical clock (CK), CA[13:0], and chip select (CS) signals communicated with the DRAMs are also illustrated.

The serial bitstream comprises a packet of multiple eight (8) bit bytes. FIG. 5, in order from left to right (and ascending time), illustrates a packet comprising a chip select/rank byte, first, second, and third command/address information bytes, and a combination command/address and end of command/address (EOCA) byte. Multiples of synchronization bytes can be inserted between the packets. The combination command/address and end of command/address byte of the packet includes four (4) bits of command/address information and a four bit EOCA field that indicates whether the next byte will be more command/address information or not. If the next byte will be more command/address information, the four bit EOCA field also indicates the rank that the next command/address information is directed at.

It should be understood from FIG. 5, that the chip select/rank byte results in the CS signal being asserted concurrently with the first fourteen bits (CA[13:0]) of command/address information being communicated with a DRAM. The first fourteen bits (CA[13:0]) of command/address information being communicated with a DRAM arrives in the first command/address information byte and the first six bits of the second command/address information byte. The remaining fourteen bits (CA[14:27]) of command/address information being communicated with a DRAM arrives in last two bits of the second command/address information byte, the third command/address information byte, and the first four bits of the combination command/address and EOCA byte. The EOCA field is the last four bits of the combination command/address and EOCA byte.

Example encodings for the synchronization byte and the chip select/rank byte, are given in Table 1. Example encodings for the EOCA field are given in Table 2.

TABLE 1

| Byte function | Binary |
| --- | --- |
| SYNC | 01010101 |
| Select Rank #0 | 01100100 |
| Select Rank #1 | 01100101 |
| Select Rank #2 | 01100110 |
| Select Rank #3 | 01100111 |

TABLE 2

| EOCA function | Binary |
| --- | --- |
| Next byte not CA info | 0101 |
| Next byte is CA info and Select Rank #0 | 1000 |
| Next is byte CA info and Select Rank #1 | 1001 |
| Next is byte CA info and Select Rank #2 | 1010 |
| Next is byte CA info and Select Rank #3 | 1011 |

Figure 6:
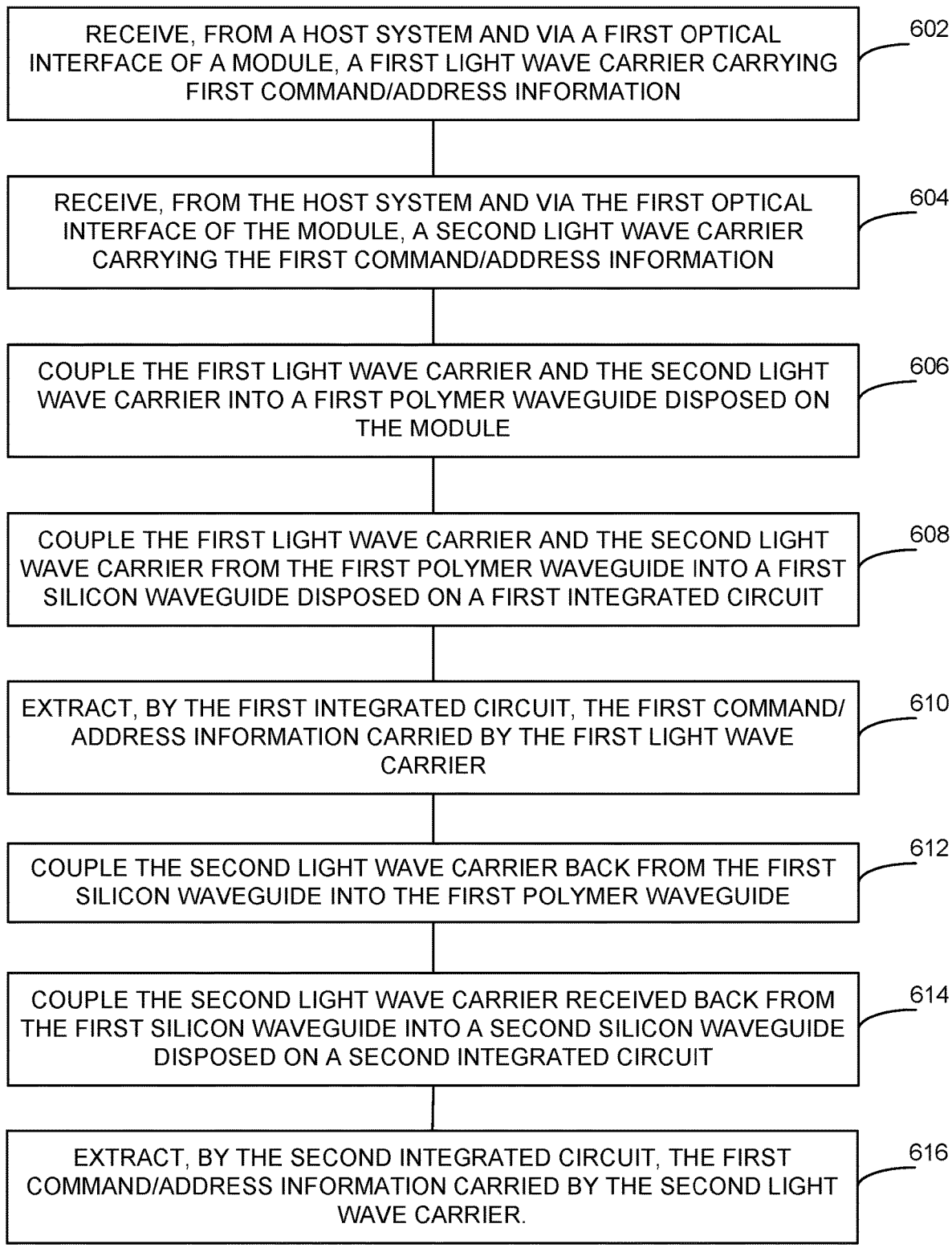
FIG. 6 is a flowchart illustrating multiwavelength bus communication.

FIG. 6 is a flowchart illustrating multiwavelength bus communication. One or more steps illustrated in FIG. 6 may be performed by, for example, module 100, system 200, integrated circuit 320, buffer integrated circuits 420*a*-420*c*, and/or their components. From a host system and via a first optical interface of a module, a first light wave carrier carrying first command/address information is received (602). For example, optical interface 241 may receive, from host 290, a light wave carrier having wavelength $\lambda_1$ carrying serialized command/address information placed on the light wave carrier by modulator 295.

From the host system and via the first optical interface of a module, a second light wave carrier carrying first command/address information is received (604). For example, optical interface 241 may receive, from host 290, a light wave carrier having wavelength $\lambda 2$ carrying serialized command/address information placed on the light wave carrier by modulator 295. The first light wave carrier and the second light wave carrier are coupled into a first polymer waveguide disposed on the module (606). For example, optical interface 241 may couple the received light wave carrier having wavelength $\lambda_1$ and the received light wave carrier having wavelength $\lambda_2$ into polymer waveguide 211.

The first light wave carrier and the second light wave carrier are coupled from the first polymer waveguide into a first silicon waveguide disposed on a first integrated circuit (608). For example, a coupling structure (e.g., optical coupler 131 and/or tapered coupler section 331) may couple the light wave carrier having wavelength $\lambda_1$ and the light wave carrier having wavelength $\lambda_2$ into a silicon waveguide on buffer 220a. By the first integrated circuit, the first command/address information carried by the first light wave carrier is extracted (610). For example, the light wave carrier having wavelength $\lambda_1$ traveling along the silicon waveguide on buffer 220a may be diverted by a wavelength specific ring coupler (e.g., ring coupler 334a) to another waveguide (e.g., waveguide 334b, optical crossover 334c, and waveguide 334d) and directed to an optical-to-electrical converter (e.g., optical-to-electrical converter 321).

The second light wave carrier is coupled back from the first silicon waveguide into the first polymer waveguide (612). For example, a coupling structure (e.g., optical coupler 132 and/or tapered coupler section 332) may couple the light wave carrier having wavelength $\lambda_2$ traveling along the silicon waveguide on buffer 220a into polymer waveguide 211. The second light wave carrier received back from the first silicon waveguide is coupled into a second silicon waveguide disposed on a second integrated circuit (614). For example, a coupling structure (e.g., optical coupler 131 and/or tapered coupler section 331) may couple the light wave carrier having wavelength $\lambda_2$ traveling along polymer waveguide 211 into a silicon waveguide on buffer 220b.

By the second integrated circuit, the first command/address information carried by the second light wave carrier is extracted (616). For example, the light wave carrier having wavelength $\lambda_2$ traveling along the silicon waveguide on buffer 220b may be diverted by a wavelength specific ring coupler (e.g., ring coupler 334a) to another waveguide (e.g., waveguide 334b, optical crossover 334c, and waveguide 334d) and directed to an optical-to-electrical converter (e.g., optical-to-electrical converter 321).

FIG. 7 is a flowchart illustrating multiwavelength bus synchronization. One or more steps illustrated in FIG. 7 may be performed by, for example, module 100, system 200, integrated circuit 320, buffer integrated circuits 420a-420c, and/or their components. From a host system and via an optical interface of a module, a first light wave carrier carrying command/address (CA) information and a second light wave carrier carrying synchronization information are received where the first and second light wave carriers have different wavelengths (702). For example, optical interface 241 may receive, from host 290, a light wave carrier having wavelength $\lambda_1$ that is carrying command/address information modulated by modulator 295 (such as the light wave carrier represented by arrow 261b in FIG. 2B) and also receive, from host 290, a light wave carrier having wavelength $\lambda_{M+1}$ that is carrying synchronization information modulated by modulator 296 (such as the light wave carrier represented by arrow 264b in FIG. 2C).

The first and second light wave carriers are coupled into a polymer waveguide disposed on the module (704). For example, optical interface 241 may couple the received light wave carrier having wavelength $\lambda_1$ and the received light wave carrier having wavelength $\lambda_{M+1}$ into polymer waveguide 211. The first and second light wave carriers are coupled from the polymer waveguide into a first silicon waveguide disposed on a first integrated circuit (706). For example, a coupling structure (e.g., optical coupler 131 and/or tapered coupler section 331) may couple the light wave carrier having wavelength $\lambda_1$ and the light wave carrier having wavelength $\lambda_{M+1}$ into a silicon waveguide on buffer 220a.

The first light wave carrier is coupled to a first light sensing device disposed on the first integrated circuit to receive the CA information from the first light wave carrier (708). For example, the light wave carrier having wavelength $\lambda_1$ traveling along the silicon waveguide on buffer 220a may be diverted by a wavelength specific ring coupler (e.g., ring coupler 334a) to another waveguide (e.g., waveguide 334b, optical crossover 334c, and waveguide 334d) and directed to an optical-to-electrical converter (e.g., optical-to-electrical converter 321) in order to receive the command/address information and provide it to circuitry (e.g., circuitry 323a-323c). The second light wave carrier is coupled to a second light sensing device disposed on the first integrated circuit to receive the synchronization information from the second light wave carrier (710). For example, the light wave carrier having wavelength $\lambda_{M+1}$ traveling along the silicon waveguide on buffer 220a may be diverted by a wavelength specific ring coupler (e.g., ring coupler 335a) to another waveguide (e.g., waveguide 335b, optical crossover 335c, and waveguide 335d) and directed to an optical-to-electrical converter (e.g., optical-to-electrical converter 322) in order to receive the synchronization information (e.g., clock signal) and provide it to circuitry (e.g., circuitry 323a-323c).

FIGS. 8A-8B are a flowchart illustrating multiwavelength bus communication and synchronization. One or more steps illustrated in FIGS. 8A-8B may be performed by, for example, module 100, system 200, integrated circuit 320, buffer integrated circuits 420a-420c, and/or their components. From a host system and via an optical interface of a module, a first light wave carrier carrying command/address (CA) information and a second light wave carrier carrying timing information are received (802). For example, optical interface 241 may receive, from host 290, a light wave carrier having wavelength $\lambda_1$ that is carrying command/address information modulated by modulator 295 (such as the light wave carrier represented by arrow 261b in FIG. 2B) and also receive, from host 290, a light wave carrier having wavelength $\lambda_{M+1}$ that is carrying timing information modulated by modulator 296 (such as the light wave carrier represented by arrow 264b in FIG. 2C).

From the host system and via the optical interface of a module, a third light wave carrier carrying command/address (CA) information and a second light wave carrier carrying timing information are received where the first, second, third, and fourth light wave carriers each have different wavelengths (804). For example, optical interface 241 may receive, from host 290, a light wave carrier having wavelength $\lambda_2$ that is carrying command/address information modulated by modulator 295 and also receive, from host 290, a light wave carrier having wavelength $\lambda_{M+2}$ that is carrying timing information modulated by modulator 296.

The first, second, third, and fourth light wave carriers are coupled into a polymer waveguide disposed on the module (806). For example, optical interface 241 may couple the received light wave carrier having wavelength $\lambda_1$, the received light wave carrier having wavelength $\lambda_2$, the received light wave carrier having wavelength $\lambda_{M+1}$, and the received light wave carrier having wavelength $\lambda_{M+2}$ into polymer waveguide 211. The first, second, third, and fourth light wave carriers are coupled into first silicon waveguide disposed on a first integrated circuit (808). For example, a coupling structure (e.g., optical coupler 131 and/or tapered coupler section 331) may couple the light wave carrier having wavelength $\lambda_1$, the light wave carrier having wavelength $\lambda_2$, the light wave carrier having wavelength $\lambda_{M+1}$, and the light wave carrier having wavelength $\lambda_{M+2}$ into a silicon waveguide on buffer 220a.

The first light wave carrier is coupled to a first light sensing device disposed on the first integrated circuit to receive the CA information from the first light wave carrier (810). For example, the light wave carrier having wavelength $\lambda_1$ traveling along the silicon waveguide on buffer 220a may be diverted by a wavelength specific ring coupler (e.g., ring coupler 334a) to another waveguide (e.g., waveguide 334b, optical crossover 334c, and waveguide 334d) and directed to an optical-to-electrical converter (e.g., optical-to-electrical converter 321) in order to receive the command/address information and provide it to circuitry (e.g., circuitry 323a-323c). The second light wave carrier is coupled to a second light sensing device disposed on the first integrated circuit to receive the timing information from the second light wave carrier (812). For example, the light wave carrier having wavelength $\lambda_{M+1}$ traveling along the silicon waveguide on buffer 220a may be diverted by a wavelength specific ring coupler (e.g., ring coupler 335a) to another waveguide (e.g., waveguide 335b, optical crossover 335c, and waveguide 335d) and directed to an optical-to-electrical converter (e.g., optical-to-electrical converter 322) in order to receive the timing information (e.g., clock signal) and provide it to circuitry (e.g., circuitry 323a-323c).

The third and fourth light wave carriers are coupled back from the first silicon waveguide into the polymer waveguide (814). For example, a coupling structure (e.g., optical coupler 132 and/or tapered coupler section 332) may couple the light wave carrier having wavelength $\lambda_2$ and the light wave carrier having wavelength $\lambda_{M+2}$ traveling along the silicon waveguide on buffer 220a into polymer waveguide 211. The third and fourth light wave carriers received back from the first silicon waveguide are coupled into a second silicon waveguide disposed on a second integrated circuit (816). For example, a coupling structure (e.g., optical coupler 131 and/or tapered coupler section 331) may couple the light wave carrier having wavelength $\lambda_2$ and the light wave carrier having wavelength $\lambda_{M+2}$ traveling along polymer waveguide 211 into a silicon waveguide on buffer 220b.

The third light wave carrier is coupled to a third light sensing device disposed on the second integrated circuit to receive the CA information from the third light wave carrier (818). For example, the light wave carrier having wavelength $\lambda_2$ traveling along the silicon waveguide on buffer 220b may be diverted by a wavelength specific ring coupler (e.g., ring coupler 334a) to another waveguide (e.g., waveguide 334b, optical crossover 334c, and waveguide 334d) and directed to an optical-to-electrical converter (e.g., optical-to-electrical converter 321) in order to receive the command/address information and provide it to circuitry (e.g., circuitry 323a-323c). The fourth light wave carrier is coupled to a fourth light sensing device disposed on the second integrated circuit to receive the timing information from the fourth light wave carrier (820). For example, the light wave carrier having wavelength $\lambda_{M+2}$ traveling along the silicon waveguide on buffer 220b may be diverted by a wavelength specific ring coupler (e.g., ring coupler 335a) to another waveguide (e.g., waveguide 335b, optical crossover 335c, and waveguide 335d) and directed to an optical-to-electrical converter (e.g., optical-to-electrical converter 322) in order to receive the timing information (e.g., clock signal) and provide it to circuitry (e.g., circuitry 323a-323c).

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of module 100, system 200, integrated circuit 320, buffer integrated circuits 420a-420c, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
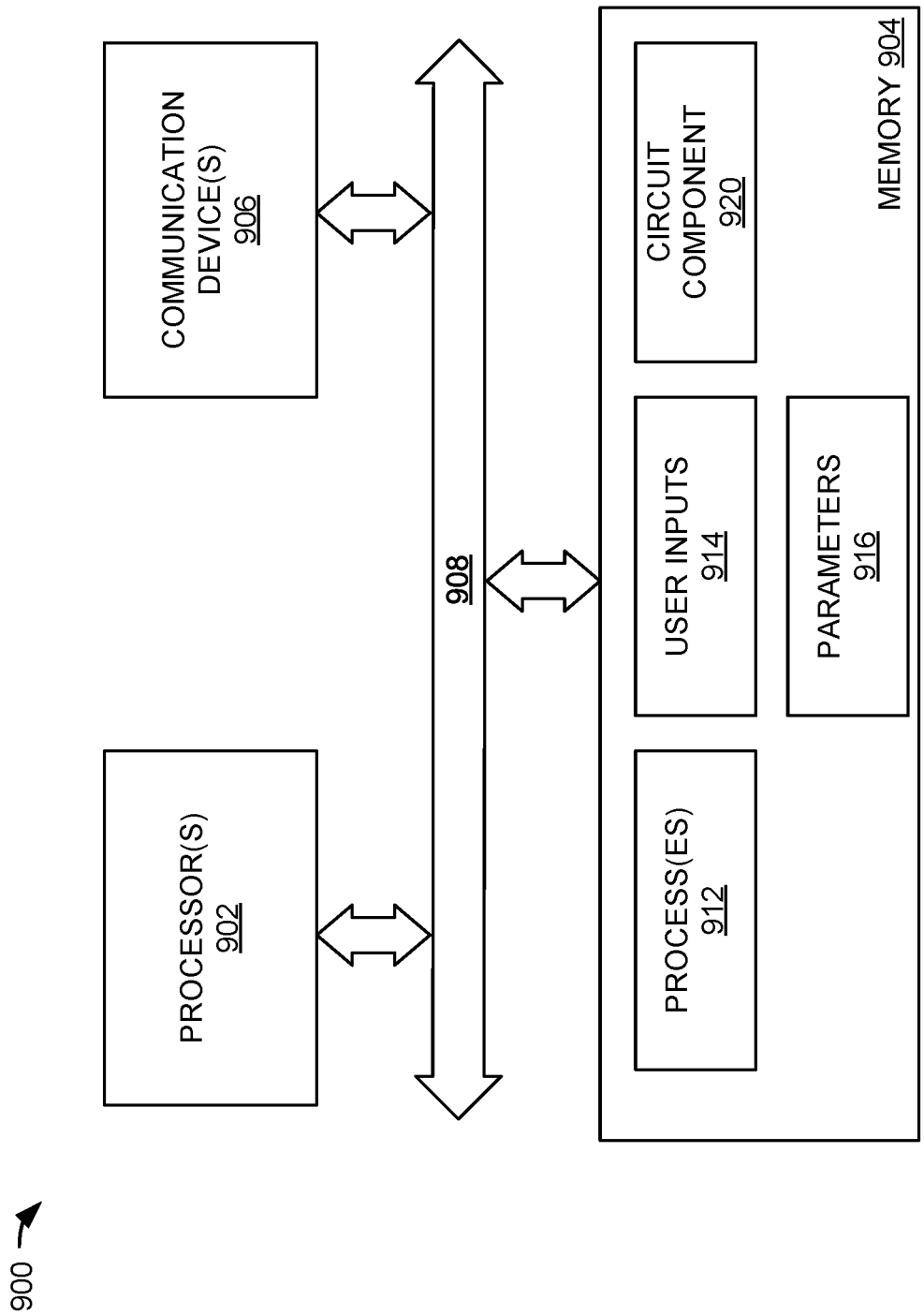
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of module 100, system 200, integrated circuit 320, buffer integrated circuits 420a-420c, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: A module, comprising: a first buffer die including a first silicon waveguide to receive a first light wave carrier and a second light wave carrier, the first buffer die to couple the first light wave carrier to a first optical to electrical interface; a second buffer die including a second silicon waveguide to receive the second light wave carrier, the second buffer die to couple the second light wave carrier to a second optical to electrical interface; a first optical interface to receive the first light wave carrier, carrying first command/address information, from a host system into a first polymer waveguide disposed on the module, and to receive the second light wave carrier, also carrying the first command/address information, from the host system into the first polymer waveguide; and the first polymer waveguide to couple the first light wave carrier and the second light wave carrier into the first silicon waveguide, and to receive the second light wave carrier back from the first silicon waveguide, and to couple the second light wave carrier into the second silicon waveguide.

Example 2: The module of example 1, further comprising: a first memory device electrically coupled with the first buffer die to receive the first command/address information from the first buffer die; and a second memory device electrically coupled with the second buffer die to receive the first command/address information from the second buffer die.

Example 3: The module of example 1, wherein the first optical interface is to receive a third light wave carrier, carrying a timing reference, from the host system into the first polymer waveguide and is also to receive a fourth light wave carrier, carrying the timing reference, from the host system into the first polymer waveguide.

Example 4: The module of example 3, wherein the first polymer waveguide is to couple the third light wave carrier and the fourth light wave carrier into the first silicon waveguide, and to receive the fourth light wave carrier back from the first silicon waveguide, and to couple the fourth light wave carrier into the second silicon waveguide.

Example 5: The module of example 4, wherein the first buffer die is to couple the third light wave carrier to a third optical to electrical interface, and the second buffer die is to couple the fourth light wave carrier to a fourth optical to electrical interface.

Example 6: The module of example 5, wherein the first buffer die is to electrically transmit the timing reference to a first memory device and the second buffer die is to electrically transmit the timing reference to a second memory device.

Example 7: The module of example 5, wherein the first buffer die uses a first wavelength resonant ring coupler to extract the first light wave carrier from the first silicon waveguide and the second buffer die uses a second wavelength resonant ring coupler to extract the second light wave carrier from the second silicon waveguide.

Example 8: The module of example 7, wherein the first buffer die uses a third wavelength resonant ring coupler to extract the third light wave carrier from the first silicon waveguide and the second buffer die uses a fourth wavelength resonant ring coupler to extract the fourth light wave carrier from the second silicon waveguide.

Example 9: A module, comprising: a first buffer device electrically coupled to a first plurality of memory devices to communicate command/address information to the first plurality of memory devices; a second buffer device electrically coupled to a second plurality of memory devices to communicate the command/address information to the second plurality of memory devices; a first optical interface to receive, via a first light wave carrier, the command/address information from a host system, and to receive, via a second light wave carrier, the command/address information from the host system; and a first polymer waveguide to couple the first light wave carrier and the second light wave carrier to the first buffer device, to receive back the second light wave carrier from the first buffer device, and to couple the second light wave carrier to the second buffer device.

Example 10: The module of example 9, wherein the first optical interface is to receive, via a third light wave carrier, timing information from the host system, and is to also receive, via a fourth light wave carrier, the timing information from the host system.

Example 11: The module of example 10, wherein the first polymer waveguide is to couple the third light wave carrier and the fourth light wave carrier to the first buffer device, to receive back the fourth light wave carrier from the first buffer device, and to couple the fourth light wave carrier to the second buffer device.

Example 12: The module of example 11, wherein the first buffer device is to communicate the timing information from the host system to the first plurality of memory devices and the second buffer device is to communicate the timing information from the host system to the second plurality of memory devices.

Example 13: The module of example 12, wherein the first buffer device is to extract the first light wave carrier and the third light wave carrier from a first silicon waveguide coupled to the first polymer waveguide.

Example 14: The module of example 13, wherein the second buffer device is to extract the second light wave carrier and the fourth light wave carrier from a second silicon waveguide coupled to the first polymer waveguide.

Example 15: The module of example 14, wherein the first light wave carrier and the third light wave carrier are to be extracted from the first silicon waveguide using a first plurality of wavelength resonant ring couplers, and the second light wave carrier and the fourth light wave carrier are to be extracted from the second silicon waveguide using a second plurality of wavelength resonant ring couplers.

Example 16: A method of operating a module, comprising: receiving, from a host system and via a first optical interface of the module, a first light wave carrier carrying command/address information; receiving, from the host system and via the first optical interface of the module, a second light wave carrier carrying the command/address information; coupling the first light wave carrier and the second light wave carrier into a first polymer waveguide disposed on the module; coupling the first light wave carrier and the second light wave carrier from the first polymer waveguide into a first silicon waveguide disposed on a first integrated circuit; extracting, by the first integrated circuit, the command/address information carried by the first light wave carrier; coupling the second light wave carrier back from the first silicon waveguide into the first polymer waveguide; coupling the second light wave carrier received back from the first silicon waveguide into a second silicon waveguide disposed on a second integrated circuit; and extracting, by the second integrated circuit, the command/address information carried by the second light wave carrier.

Example 17: The method of example 16, further comprising: electronically transmitting, by the first integrated circuit, the command/address information extracted from the first light wave carrier to a first memory device; and electronically transmitting, by the second integrated circuit, the command/address information extracted from the second light wave carrier to a second memory device.

Example 18: The method of example 17, further comprising: receiving, from the host system and via the first optical interface of the module, a third light wave carrier carrying a timing reference; and receiving, from the host system and via the first optical interface of the module, a fourth light wave carrier carrying the timing reference.

Example 19: The method of example 18, further comprising: coupling the third light wave carrier and the fourth light wave carrier into the first polymer waveguide; coupling the third light wave carrier and the fourth light wave carrier from the first polymer waveguide into the first silicon waveguide; extracting, by the first integrated circuit, the timing reference carried by the third light wave carrier; coupling the fourth light wave carrier back from the first silicon waveguide into the first polymer waveguide; coupling the fourth light wave carrier received back from the first silicon waveguide into the second silicon waveguide; and extracting, by the second integrated circuit, the timing reference carried by the second light wave carrier.

Example 20: The method of example 19, further comprising: electronically transmitting, by the first integrated circuit, the timing reference extracted from the first light wave carrier to the first memory device; and electronically transmitting, by the second integrated circuit, the timing reference extracted from the second light wave carrier to the second memory device.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A module, comprising:
  a first buffer die including a first silicon waveguide to receive a first light wave carrier and a second light wave carrier, the first buffer die to couple the first light wave carrier to a first optical to electrical interface;
  a second buffer die including a second silicon waveguide to receive the second light wave carrier, the second buffer die to couple the second light wave carrier to a second optical to electrical interface;
  a first optical interface to receive the first light wave carrier, carrying first command/address information, from a host system into a first polymer waveguide disposed on the module, and to receive the second light wave carrier, also carrying the first command/address information, from the host system into the first polymer waveguide; and,
  the first polymer waveguide to couple the first light wave carrier and the second light wave carrier into the first silicon waveguide, and to receive the second light wave carrier back from the first silicon waveguide, and to couple the second light wave carrier into the second silicon waveguide.

2. The module of claim 1, further comprising:
  a first memory device electrically coupled with the first buffer die to receive the first command/address information from the first buffer die; and,
  a second memory device electrically coupled with the second buffer die to receive the first command/address information from the second buffer die.

3. The module of claim 1, wherein the first optical interface is to receive a third light wave carrier, carrying a timing reference, from the host system into the first polymer waveguide and is also to receive a fourth light wave carrier, carrying the timing reference, from the host system into the first polymer waveguide.

4. The module of claim 3, wherein the first polymer waveguide is to couple the third light wave carrier and the fourth light wave carrier into the first silicon waveguide, and to receive the fourth light wave carrier back from the first silicon waveguide, and to couple the fourth light wave carrier into the second silicon waveguide.

5. The module of claim 4, wherein the first buffer die is to couple the third light wave carrier to a third optical to electrical interface, and the second buffer die is to couple the fourth light wave carrier to a fourth optical to electrical interface.

6. The module of claim 5, wherein the first buffer die is to electrically transmit the timing reference to a first memory device and the second buffer die is to electrically transmit the timing reference to a second memory device.

7. The module of claim 5, wherein the first buffer die uses a first wavelength resonant ring coupler to extract the first light wave carrier from the first silicon waveguide and the second buffer die uses a second wavelength resonant ring coupler to extract the second light wave carrier from the second silicon waveguide.

8. The module of claim 7, wherein the first buffer die uses a third wavelength resonant ring coupler to extract the third light wave carrier from the first silicon waveguide and the second buffer die uses a fourth wavelength resonant ring coupler to extract the fourth light wave carrier from the second silicon waveguide.

9. A module, comprising:
  a first buffer device electrically coupled to a first plurality of memory devices to communicate command/address information to the first plurality of memory devices;
  a second buffer device electrically coupled to a second plurality of memory devices to communicate the command/address information to the second plurality of memory devices;

a first optical interface to receive, via a first light wave carrier, the command/address information from a host system, and to receive, via a second light wave carrier, the command/address information from the host system; and a first polymer waveguide to couple the first light wave carrier and the second light wave carrier to the first buffer device, to receive back the second light wave carrier from the first buffer device, and to couple the second light wave carrier to the second buffer device.

10. The module of claim 9, wherein the first optical interface is to receive, via a third light wave carrier, timing information from the host system, and is to also receive, via a fourth light wave carrier, the timing information from the host system.

11. The module of claim 10, wherein the first polymer waveguide is to couple the third light wave carrier and the fourth light wave carrier to the first buffer device, to receive back the fourth light wave carrier from the first buffer device, and to couple the fourth light wave carrier to the second buffer device.

12. The module of claim 11, wherein the first buffer device is to communicate the timing information from the host system to the first plurality of memory devices and the second buffer device is to communicate the timing information from the host system to the second plurality of memory devices.

13. The module of claim 12, wherein the first buffer device is to extract the first light wave carrier and the third light wave carrier from a first silicon waveguide coupled to the first polymer waveguide.

14. The module of claim 13, wherein the second buffer device is to extract the second light wave carrier and the fourth light wave carrier from a second silicon waveguide coupled to the first polymer waveguide.

15. The module of claim 14, wherein the first light wave carrier and the third light wave carrier are to be extracted from the first silicon waveguide using a first plurality of wavelength resonant ring couplers, and the second light wave carrier and the fourth light wave carrier are to be extracted from the second silicon waveguide using a second plurality of wavelength resonant ring couplers.

16. A method of operating a module, comprising:
receiving, from a host system and via a first optical interface of the module, a first light wave carrier carrying command/address information;
receiving, from the host system and via the first optical interface of the module, a second light wave carrier carrying the command/address information;
coupling the first light wave carrier and the second light wave carrier into a first polymer waveguide disposed on the module;
coupling the first light wave carrier and the second light wave carrier from the first polymer waveguide into a first silicon waveguide disposed on a first integrated circuit;
extracting, by the first integrated circuit, the command/address information carried by the first light wave carrier;
coupling the second light wave carrier back from the first silicon waveguide into the first polymer waveguide;
coupling the second light wave carrier received back from the first silicon waveguide into a second silicon waveguide disposed on a second integrated circuit; and
extracting, by the second integrated circuit, the command/address information carried by the second light wave carrier.

17. The method of claim 16, further comprising:
electronically transmitting, by the first integrated circuit, the command/address information extracted from the first light wave carrier to a first memory device; and
electronically transmitting, by the second integrated circuit, the command/address information extracted from the second light wave carrier to a second memory device.

18. The method of claim 17, further comprising:
receiving, from the host system and via the first optical interface of the module, a third light wave carrier carrying a timing reference; and
receiving, from the host system and via the first optical interface of the module, a fourth light wave carrier carrying the timing reference.

19. The method of claim 18, further comprising:
coupling the third light wave carrier and the fourth light wave carrier into the first polymer waveguide;
coupling the third light wave carrier and the fourth light wave carrier from the first polymer waveguide into the first silicon waveguide;
extracting, by the first integrated circuit, the timing reference carried by the third light wave carrier;
coupling the fourth light wave carrier back from the first silicon waveguide into the first polymer waveguide;
coupling the fourth light wave carrier received back from the first silicon waveguide into the second silicon waveguide; and
extracting, by the second integrated circuit, the timing reference carried by the second light wave carrier.

20. The method of claim 19, further comprising:
electronically transmitting, by the first integrated circuit, the timing reference extracted from the first light wave carrier to the first memory device; and
electronically transmitting, by the second integrated circuit, the timing reference extracted from the second light wave carrier to the second memory device.

* * * * *